United States Patent [19]
Martin

[11] Patent Number: 5,230,149
[45] Date of Patent: Jul. 27, 1993

[54] METHOD OF MANUFACTURING A HYDRAULIC SEAL
[75] Inventor: Jon W. Martin, Los Alamitos, Calif.
[73] Assignee: TRW Inc., Lyndhurst, Ohio
[21] Appl. No.: 939,073
[22] Filed: Sep. 1, 1992
[51] Int. Cl.⁵ .................. B32B 31/06; B31B 31/00
[52] U.S. Cl. .................. 29/888.072; 29/888.076; 29/88.3; 264/139; 264/250; 264/268
[58] Field of Search .......... 29/888.3, 888.07, 888.072, 29/888.075, 888.076; 264/139, 160, 250, 268; 277/223, 228

[56] References Cited
U.S. PATENT DOCUMENTS 2,837,359  6/1958  Corsi .
3,697,090 10/1972  Brenneke .
3,775,832 12/1973  Werra .
3,811,692  5/1974  Brenneke .
4,040,063  8/1977  Albertson et al. .
4,328,972  5/1982  Albertson et al. ............. 277/228 X
4,501,431  2/1985  Peisker et al. .
4,699,387 10/1987  Buseth ......................... 277/228 X
4,915,892  4/1990  Peppiatt ....................... 264/250 X
5,013,052  5/1991  Butler et al. .

Primary Examiner—Joseph M. Gorski
Assistant Examiner—Khan V. Nguyen
Attorney, Agent, or Firm—Tarolli, Sundheim & Covell

[57] ABSTRACT

A method of manufacturing a ring-shaped hydraulic seal (10) produces a cylindrical sealing surface (12) having portions (24) formed of a plastic material and portions (26) formed of an elastomeric material. The method includes the steps of forming a plastic ring (30) and molding an elastomeric material into a cavity (50) in the plastic ring (30). The cylindrical sealing surface (12) is formed by grinding away the material of the ring (30) to expose a surface (26) of the elastomeric material which is contained in the cavity (50) in the ring (30). The plastic portions (24) of the cylindrical sealing surface (12) are defined by the ground surface (82) of the plastic ring (30). The elastomeric portions (26) of the cylindrical sealing surface (12) are defined by the exposed surfaces (26) of the elastomeric material.

14 Claims, 2 Drawing Sheets

METHOD OF MANUFACTURING A HYDRAULIC SEAL

FIELD OF THE INVENTION

The present invention relates to hydraulic seals, and particularly relates to the manufacturing of ring-shaped hydraulic seals.

BACKGROUND OF THE INVENTION

A ring-shaped hydraulic seal has a radially inner surface and a radially outer surface. Either or both of those surfaces can be formed as a sealing surface. For example, a piston ring typically has a radially outer sealing surface. The radially outer sealing surface is a dynamic sealing surface for engaging the inner surface of a cylinder in which the piston ring moves with a piston. A shaft seal typically has both radially inner and radially outer sealing surfaces. The radially inner sealing surface is a dynamic sealing surface for engaging a shaft which moves through the shaft seal. The radially outer sealing surface is a static sealing surface for engaging the wall of a cylinder in which the shaft moves.

It is known that a hydraulic sealing surface will provide the lowest leakage of hydraulic fluid if it is formed of an elastomer. It is also known that a hydraulic sealing surface will have a lower coefficient of friction if it is formed of plastic. However, plastics do not seal as well as elastomers. Accordingly, there is a trade-off between the ability of a seal to control leakage and to avoid friction. Sealing surfaces are therefore commonly formed with both elastomeric and plastic portions. When a hydraulic seal having both elastomeric and plastic components is designed, the geometries of those components are fixed when the forming tools, such as molds, are made. If the relative sizes of the elastomeric and plastic sealing surface portions are to be changed in a new design, new forming tools must be made.

SUMMARY OF THE INVENTION

The present invention is a method of manufacturing a hydraulic seal with a cylindrical sealing surface. The cylindrical sealing surface has a plastic portion and an elastomeric portion.

The method comprises the steps of forming a ring of plastic material, and molding an elastomeric material into the ring. The ring is formed with a surface means defining a cavity within the ring. The cavity has an end which is closed by a portion of the plastic material of which the ring is formed. The elastomeric material is molded into the cavity in the ring.

The method further comprises a forming step which forms the cylindrical sealing surface The forming step comprises the step of removing a portion of the plastic material from the ring. Specifically, the portion of the plastic material that closes the cavity is removed from the ring. The removing step thus opens the closed end of the cavity to expose a surface of the elastomeric material in the cavity, and further exposes a cylindrical surface of the plastic ring. The cylindrical sealing surface is thus formed, with the plastic portion being defined by the exposed cylindrical surface of the plastic ring, and with the elastomeric portion being defined by the exposed surface of the elastomeric material in the cavity.

The method of manufacturing a hydraulic seal in accordance with the present invention is readily adaptable to manufacture a plurality of hydraulic seals with sealing surfaces that differ from each other. The layout of the plastic and elastomeric portions of the sealing surface is determined by the size and shape of the elastomeric surface that is exposed at the opened cavity. The layout of the plastic and elastomeric portions of the sealing surface is thus determined by the size and shape of the cavity containing the elastomeric material in the plastic ring. A differently designed sealing surface can therefore be formed in accordance with the present invention by merely changing the design of the cavity formed in the plastic ring. The cavity is preferably formed by cutting a preformed plastic ring. The design of the sealing surface can then be changed without changing the design of molds in which the plastic or elastomeric portions of the seal might otherwise be shaped.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
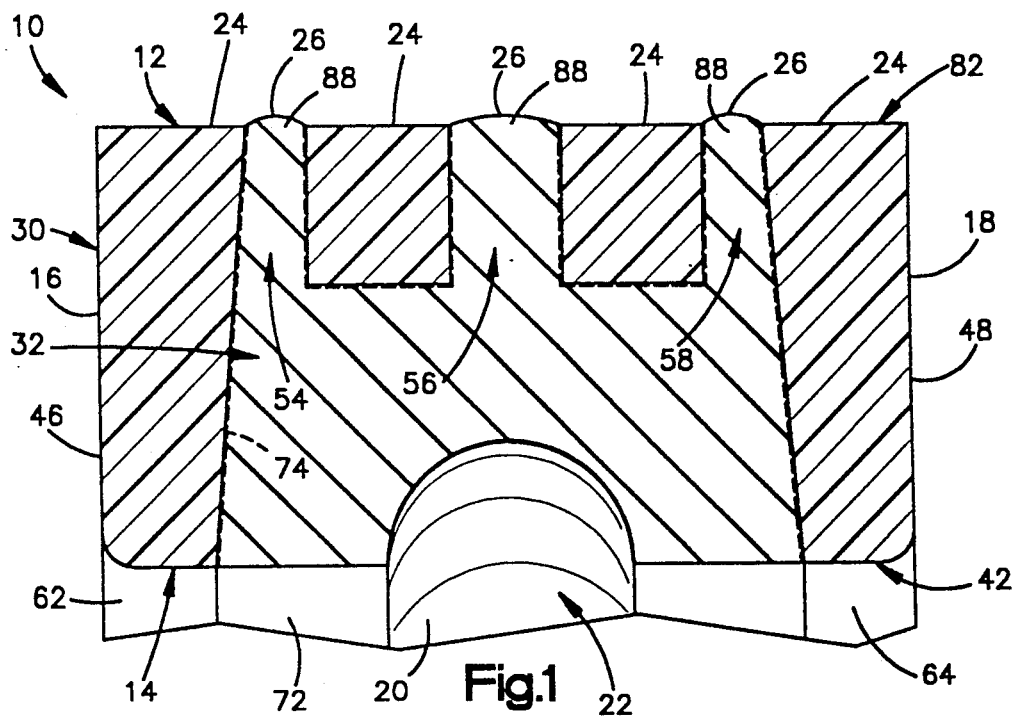
FIG. 1 is a sectional view of a piston ring manufactured in a preferred method practiced in accordance with the present invention.

The present invention is a method of manufacturing a hydraulic seal having a cylindrical sealing surface For example, a piston ring 10 manufactured in accordance with the present invention is shown in cross section in FIG. 1. The piston ring 10 has a cylindrical outer surface 12, a cylindrical inner surface 14, and a pair of opposite axial side surfaces 16 and 18. The cylindrical outer surface 12 of the piston ring 10 is a cylindrical sealing surface which is formed in accordance with the present invention The piston ring 10 is designed to be installed on a piston, and to fit closely in an annular space between the piston and a surrounding cylinder in which the piston moves. The cylindrical inner surface 14 of the piston ring 10 has a recessed portion 20 which defines a circumferentially extending groove 22. The groove 22 is shaped to receive a complementary projecting portion of the piston. The cylindrical inner surface 14 is thus designed to support the piston ring 10 on the piston. The cylindrical outer surface 12 of the piston ring 10 has portions 24 formed of a plastic material and portions 26 formed of an elastomeric material. The cylindrical outer surface 12 is thus designed as a dynamic outer sealing surface for engaging the surrounding surface of the cylinder in hydraulic sealing contact.

Figure 2:
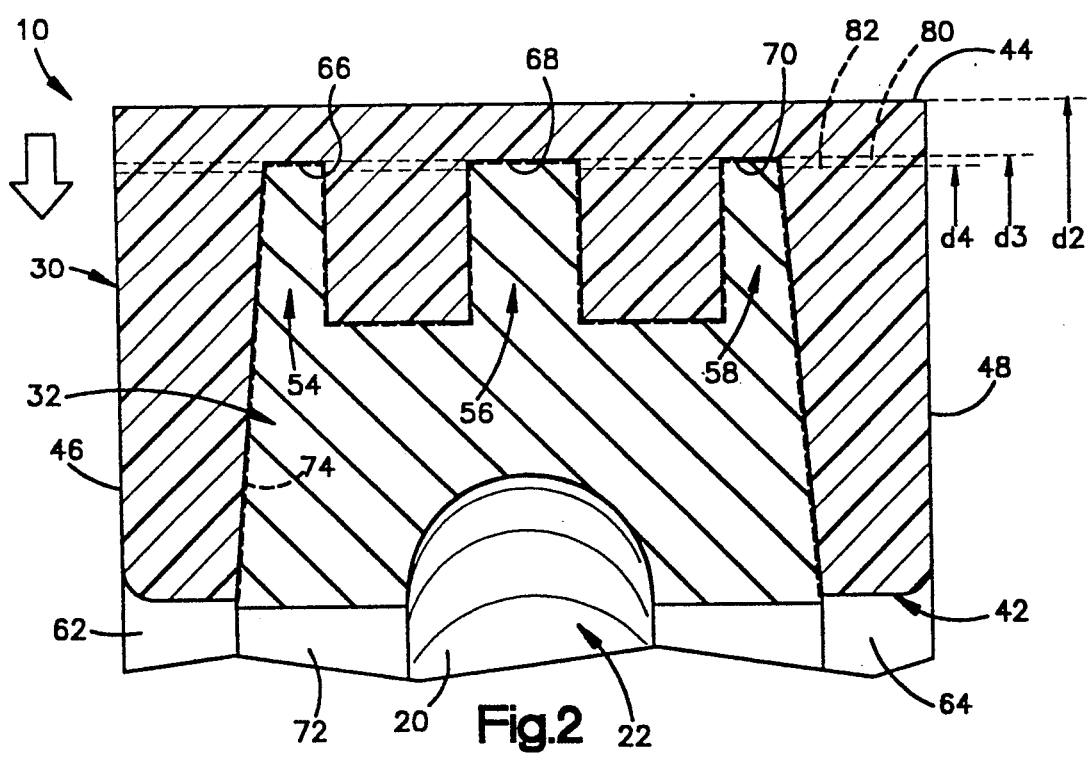
FIG. 2 is a sectional view of the piston ring of FIG. 1 in a partially manufactured condition taken at one stage in the method.

FIG. 2 shows the piston ring 10 in a condition taken at one stage of the method of manufacture. At this stage of the method, the piston ring 10 comprises a ring 30 of plastic material and an insert 32 of elastomeric material.

The plastic material of the ring 30 is preferably a fluorocarbon resin such as that marketed by E. I. du Pont de Nemours & Co. with the trademark "TEFLON". The elastomeric material of the insert 32 is preferably NBR, HNBR, FKM or PNF rubber. The particular plastic and elastomeric materials of the piston ring 10 are selected with reference to the performance of the finished piston ring 10.

Figure 3A:
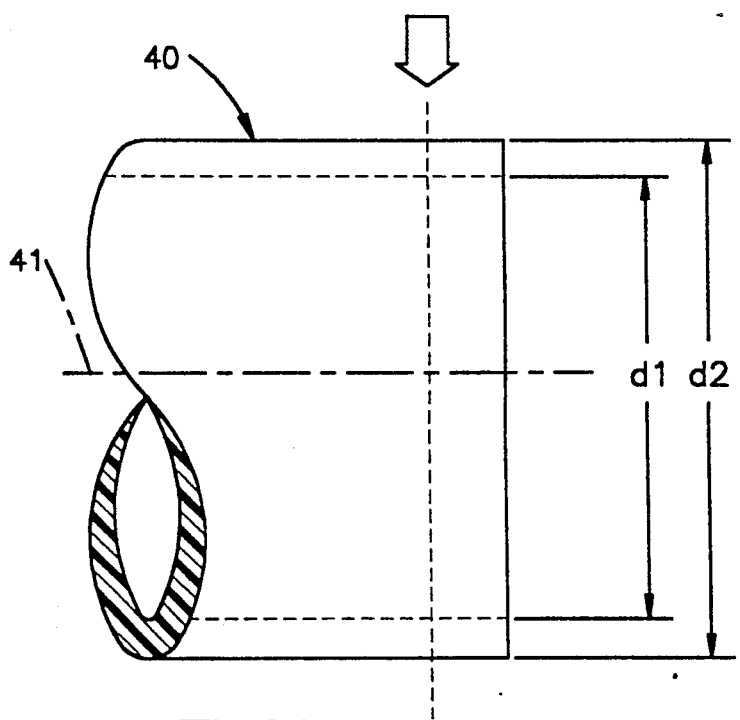
FIG. 3A illustrates a step taken in formation of a part of the piston ring shown in FIG. 1.

The plastic material of the ring 30 is first extruded as a tubular piece 40, as shown in FIG. 3A. The tubular piece 40 has an axis 41, an inner diameter d1, and an outer diameter d2. The inner diameter d1 is equal to the diameter of the cylindrical inner surface 14 of the finished piston ring 10. The outer diameter d2 is substantially greater than the diameter of the plastic portions 24 of the outer sealing surface 12 of the finished piston ring 10.

Figure 3B:
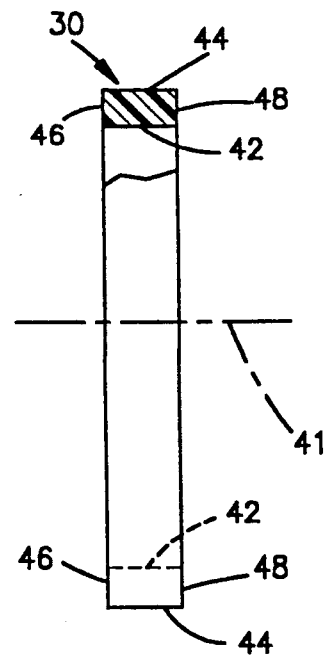
FIG. 3B is a view of a part formed as illustrated in FIG. 3A.

The ring 30 of plastic material is formed by cutting a section with a length L from the tubular piece 40, as indicated by the arrow shown in FIG. 3A. The ring 30 of plastic material is thus formed with a rectangular cross-sectional shape as shown in FIG. 3B. The ring 30 then has a cylindrical inner surface 42 with the diameter d1, a cylindrical outer surface 44 with the diameter d2, and a pair of axially opposite side surfaces 46 and 48 which are spaced from each other the distance L.

Figure 4:
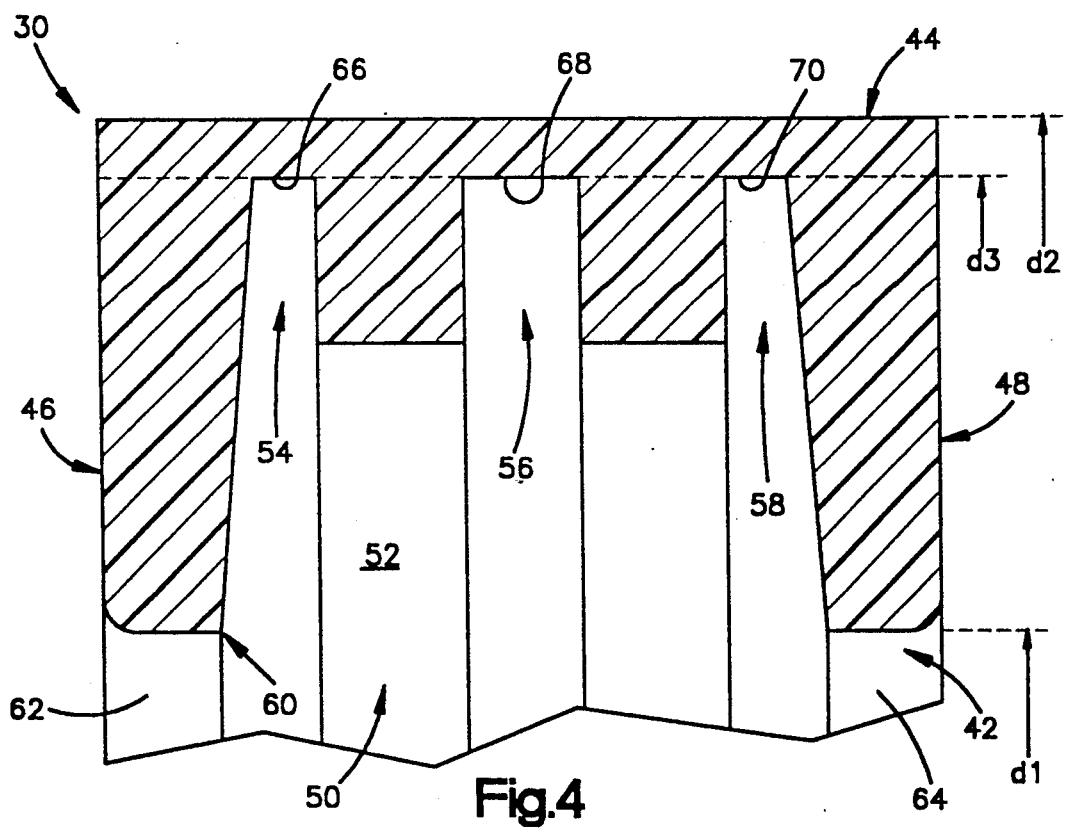
FIG. 4 is a sectional view of the part shown in FIG. 3B in a further processed condition.

After the ring 30 is formed as shown in FIG. 3B, it is further formed on a numerically controlled cutting machine so as to take the shape shown in FIG. 4. Specifically, a cavity 50 is cut into the ring 30. The cavity 50 extends circumferentially entirely around the axis 41. The cavity 50 has a main portion 52 and three compartments 54, 56 and 58 which extend radially outward from the main portion 52. The main portion 52 of the cavity 50 has an open end 60 which interrupts the cylindrical inner surface 42 of the ring 30. The open end 60 of the cavity 50 thus separates portions 62 and 64 of the cylindrical inner surface 42 from each other. The compartments 54, 56 and 58 in the cavity 50 have open ends which communicate with each other through the main portion 52. The compartments 54, 56 and 58 also have closed ends which are defined by respective cylindrical end walls 66, 68 and 70. The cylindrical end walls 66, 68 and 70 all have a diameter d3 which is slightly greater than the diameter of the plastic portions 24 of the outer sealing surface 12 of the finished piston ring 10 (FIG. 1). A numerically controlled cutting machine can be programmed appropriately by one skilled in the art to cut the cavity 50 into the ring 30.

After the ring 30 is formed as shown in FIG. 4, the elastomeric material of the insert 32 is molded into the cavity 50 in the ring 30. The elastomeric material fills the compartments 54, 56 and 58 as shown in FIG. 2, and forms a radially inner surface 72 of the insert 32 which extends across the open end 60 of the cavity 50. The groove 22 is preferably formed in the radially inner surface 72 of the insert 32 when the elastomeric material is molded into the cavity 50. The cylindrical inner surface 14 of the finished piston ring 10 is thus defined in part by the radially inner surface 72 of the insert 32, and in part by the axially spaced inner surface portions 62 and 64 of the ring 30. As shown in FIGS. 1 and 2, the radially inner surface 72 of the insert 32 protrudes slightly beyond the inner surface portions 62 and 64 of the ring 30. An adhesive is preferably applied over the inner surfaces of the ring 30 within the cavity 50 before the elastomeric material is inserted. The adhesive establishes a bond 74 which securely holds the elastomeric and plastic materials together.

The next step in the method of manufacturing the piston ring 10 is a grinding step which is performed on the structure shown in FIG. 2. In the grinding step, a suitable grinding tool is used to grind away the plastic material of the ring 30 in a direction radially inward from the cylindrical outer surface 44, as indicated by the arrow shown in FIG. 2. The grinding step thus reduces the diameter of the ring 30 by removing plastic material from the ring 30 progressively in a direction from the cylindrical outer surface 44 toward the cylindrical end walls 66, 68 and 70 of the compartments 54, 55 and 56.

The end walls 66, 68 and 70 of the compartments 54, 55 and 56 all have the diameter d3. Therefore, when the grinding tool reaches the location of the end walls 66, 68 and 70, the ring 30 is provided with a newly-formed cylindrical outer surface 80 having the diameter d3, as indicated by a dashed line in FIG. 2. Moreover, when the grinding tool reaches the location of the end walls 66, 68 and 70, the plastic material which defines the end walls 66, 68 and 70 is ground away. The elastomeric material in the compartments 54, 55 and 56 is thereby exposed at the newly-formed outer surface 80. The piston ring 10 then has a cylindrical outer surface which is defined in part by the outer surface 80 of the plastic ring 30, and in part by the exposed portions of the elastomeric insert 32. Such a cylindrical outer surface with both plastic and elastomeric portions could serve as the outer sealing surface of the piston ring 10. However, in the preferred method of forming the piston ring 10 in accordance with the present invention, the structure shown in FIG. 2 is further processed to form the outer sealing surface 12 shown in FIG. 1.

As noted above, the diameter d3 is slightly greater than the diameter of the plastic portions 24 of the outer sealing surface 12 of the finished piston ring 10. Therefore, in the preferred method practiced in accordance with the present invention, the grinding step is continued progressively beyond the locations of the end walls 66, 68 and 70 of the compartments 54, 56 and 58 in the cavity 50. A final outer surface 82 of the plastic ring 30 is then exposed at a location spaced radially inward from the location of the previously formed outer surface 80, and is thus formed with a diameter d4 which is slightly less than the diameter d3. The diameter d4 is equal to the diameter of the plastic portions 24 of the outer sealing surface 12 of the finished piston ring 10.

When the grinding step is continued radially inward beyond the end walls 66, 68 and 70 to remove more plastic material progressively from the ring 30, it simultaneously removes elastomeric material progressively from the insert 32 in the compartments 54, 56 and 58. However, the elasticity of the elastomeric material enables it to become elastically deformed beneath the advancing grinding tool. The elastomeric material is therefore ground away to a lessor extent than the adjacent portions of the plastic material. When the continued grinding step is completed, the elasticity of the elastomeric material causes it to recover from its deformed condition, and thereby to protrude slightly above the adjoining portions 24 of the final outer surface 82 of the plastic ring 30, as shown in FIG. 1. The outer sealing surface 12 of the finished piston ring 10 is thus formed, with the plastic portions 24 being defined by the final outer surface 82 of the plastic ring 30, and with the elastomeric portions 26 being defined by protruding ridges 88 of the exposed elastomeric material.

The opposite axial side surfaces 16 and 18 of the finished piston ring 10 are defined by the portions of the side surfaces 46 and 48 of the plastic ring 30 which remain after the grinding process is completed.

In the preferred embodiment, the piston ring 10 has an outer diameter of 2.67 inches which is defined by the surface portions 26 on the protruding ridges 88 of the elastomeric material. The ridges 88 protrude only about 0.005 inches radially beyond the adjoining plastic surfaces 24. The piston ring 10 has an inner diameter of 2.545 inches which is defined by the radially inner surface 72 of the elastomeric insert 32. The radially inner surface 72 of the insert 32 protrudes only about 0.010 inches radially beyond the spaced inner surface portions 62 and 64 of the plastic ring 30. The surfaces 12 and 14 of the piston ring 10 are therefore considered to be cylindrical within the context of the present invention, even though each one deviates somewhat from the shape of a perfect cylinder.

When the finished piston ring 10 is installed as described above, the outer sealing surface 12 is firmly pressed in hydraulic sealing contact with the surrounding cylindrical surface. The protruding ridges 88 are then elastically deformed radially inward so that the elastomeric portions 26 of the outer sealing surface 12 lie flush with the plastic portions 24. The elasticity of the insert 32 urges the surface portions 26 radially back outward against the surrounding cylindrical surface. The hydraulic seal established by the outer sealing surface 12 is thereby enhanced by the elasticity of the insert 32.

The method described above is readily adaptable to manufacture a piston ring or other ring-shaped hydraulic seal with a cylindrical sealing surface that differs from the outer sealing surface 12 of the piston ring 10. For example, the size, shape and/or number of the plastic and elastomeric portions 24 and 26 of the outer sealing surface 12 can be changed merely by changing the program in the numerically controlled cutting machine which produces the cavity 50 in the plastic ring 30. The shape, number and/or sizes of the compartments 54, 56 and 58 in the cavity which are opened in the grinding process, and hence the layout of the plastic and elastomeric portions 24 and 26 of the outer sealing surface 12, can thereby be changed without changing the shape of molds in which the elastomeric insert 32 and/or the plastic ring 30 might otherwise be formed. The layout of the inner surface 14 can be similarly changed.

From the above description of the invention, those skilled in the art will perceive improvements, changes and modifications. For example, the preferred grinding process is directed radially inward to form a radially outer cylindrical sealing surface, but could alternatively be directed radially outward to form a radially inner cylindrical sealing surface. Such improvements, changes and modifications within the skill of the art are intended to be covered by the appended claims.

I claim:

1. A method of manufacturing a hydraulic seal comprising the steps of:
    forming a ring of plastic material having a surface means defining a cavity within said ring, said cavity having an end closed by portion of said plastic material;
    molding an elastomeric material into said cavity; and
    forming a cylindrical sealing surface having a plastic portion and an elastomeric portion, said step of forming a cylindrical sealing surface comprising the step of removing said portion of said plastic material from said ring, said removing step thereby opening said closed end of said cavity and exposing a surface of said elastomeric material and a cylindrical surface of said ring, said plastic portion of said cylindrical sealing surface being defined by said exposed cylindrical surface of said ring, said elastomeric portion of said cylindrical sealing surface being defined by said exposed surface of said elastomeric material.

2. The method as defined in claim 1 including forming said surface means and said cavity by cutting plastic material from said ring.

3. The method as defined in claim 1 wherein said cylindrical sealing surface is a radially outer surface of said hydraulic seal, said step of forming said ring provides said ring with an original outer diameter, and said removing step reduces said original outer diameter of said ring.

4. The method as defined in claim 1 wherein said surface means defines a plurality of compartments within said cavity, each of said compartments having a respective end wall, said closed end of said cavity comprising said end walls of said compartments, and said removing step opens said closed end of said cavity by removing the plastic material of said ring which defines said end walls, said removing step thereby exposing a respective surface portion of said elastomeric material in each of said compartments.

5. The method as defined in claim 1 wherein said removing step removes said portion of said plastic material from said ring by grinding said portion of said plastic material.

6. The method as defined in claim 1 further comprising the step of coating said surface means with an adhesive before molding said elastomeric material into said cavity.

7. A method of manufacturing a hydraulic seal comprising the steps of
    forming a ring of plastic material, said ring having a first cylindrical plastic surface, and having a surface means defining a cavity within said ring, said cavity having a closed end spaced radially from said first cylindrical plastic surface;
    molding an elastomeric material into said cavity; and
    forming a cylindrical sealing surface having a plastic portion and an elastomeric portion, said step of forming a cylindrical sealing surface comprising the step of removing said plastic material from said ring progressively in a direction extending radially from said first cylindrical plastic surface toward said closed end of said cavity, said removing step forming a second cylindrical plastic surface spaced radially from the location of said first cylindrical plastic surface, said removing step also opening said closed end of said cavity and exposing a surface of said elastomeric material at said second cylindrical plastic surface, whereby said plastic portion of said cylindrical sealing surface is defined by said second cylindrical plastic surface, and said elastomeric portion of said cylindrical sealing surface is defined by said exposed surface of said elastomeric material.

8. The method as defined in claim 7 including forming said surface means and said cavity by cutting plastic material from said ring.

9. The method as defined in claim 8 wherein said first cylindrical plastic surface is a radially outer surface of said ring, and said removing step progresses in a direction extending radially inward.

10. The method as defined in claim 8 wherein said ring is formed with a third cylindrical plastic surface facing radially away from said first cylindrical plastic surface, said surface means defines an open end of said cavity at said third cylindrical plastic surface, and said molding step defines a surface of said elastomeric material which extends across said open end of said cavity, said seal thus being formed with another cylindrical surface having a plastic portion and an elastomeric portion, said plastic portion of said other cylindrical surface being defined by said third cylindrical plastic surface, said elastomeric portion of said other cylindrical surface being defined by said surface of said elastomeric material extending across said open end of said cavity.

11. The method as defined in claim 8 wherein said removing step is progressively continued radially beyond the location of said closed end of said cavity, said removing step then further removing said plastic material progressively from said ring and simultaneously removing said elastomeric material progressively from said cavity, said removing step thereby forming said second cylindrical plastic surface and said exposed surface of said elastomeric material at a location spaced radially from the location of said closed end of said cavity.

12. The method as defined in claim 11 wherein said surface means defines a plurality of compartments within said cavity, each of said compartments having a respective end wall, said closed end of said cavity comprising said end walls of said compartments, and said removing step opens said closed end of said cavity by removing the plastic material of said ring which defines said end walls, said removing step further removing said elastomeric material progressively from each of said compartments and exposing a respective surface portion of said elastomeric material in each of said compartments.

13. The method as defined in claim 12 wherein said removing step removes said plastic material from said ring and removes said elastomeric material from said cavity by grinding said materials.

14. The method as defined in claim 13 further comprising the step of coating said surface means with an adhesive before molding said elastomeric material into said cavity.

* * * * *

UNITED STATES PATENT AND TRADEMARK OFFICE
CERTIFICATE OF CORRECTION

PATENT NO. : 5,230,149
DATED : July 27, 1993
INVENTOR(S) : Jon W. Martin

It is certified that error appears in the above-indentified patent and that said Letters Patent is hereby corrected as shown below:

Column 6, line 3, change "and exposing" to --to expose--.
Column 6, line 11, delete Claim 2 in its entirety and insert --A method as defined in claim 1 wherein said surface means and said cavity are formed by cutting plastic material from said ring--.

Signed and Sealed this

Seventh Day of June, 1994

Attest:

BRUCE LEHMAN

Attesting Officer

Commissioner of Patents and Trademarks